June 24, 1924.
R. V. RULE
1,498,580
STOP SIGNAL FOR AUTOMOBILES
Filed Sept. 20 1921.   2 Sheets-Sheet 2
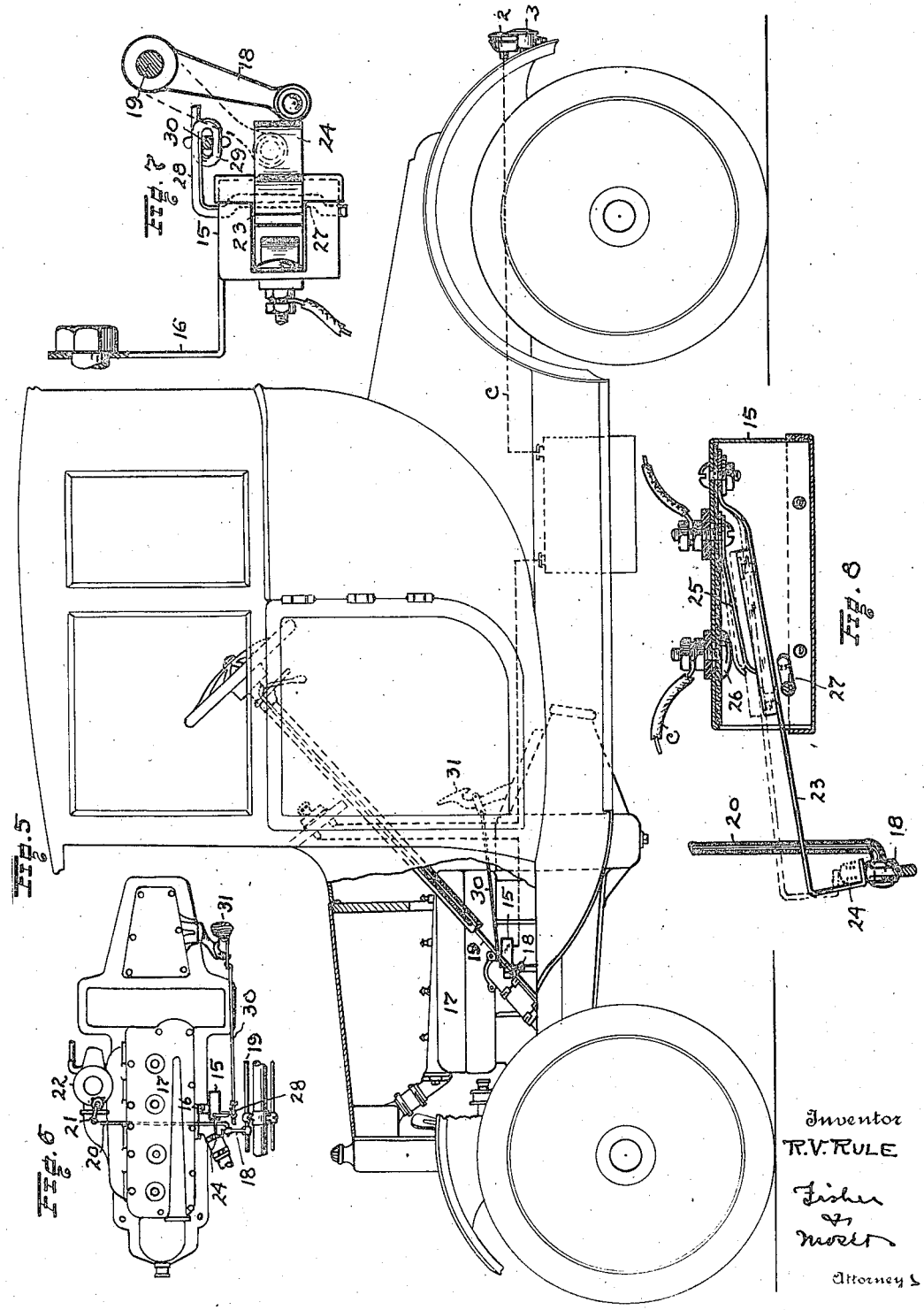
Inventor
R. V. RULE
Attorneys Patented June 24, 1924.

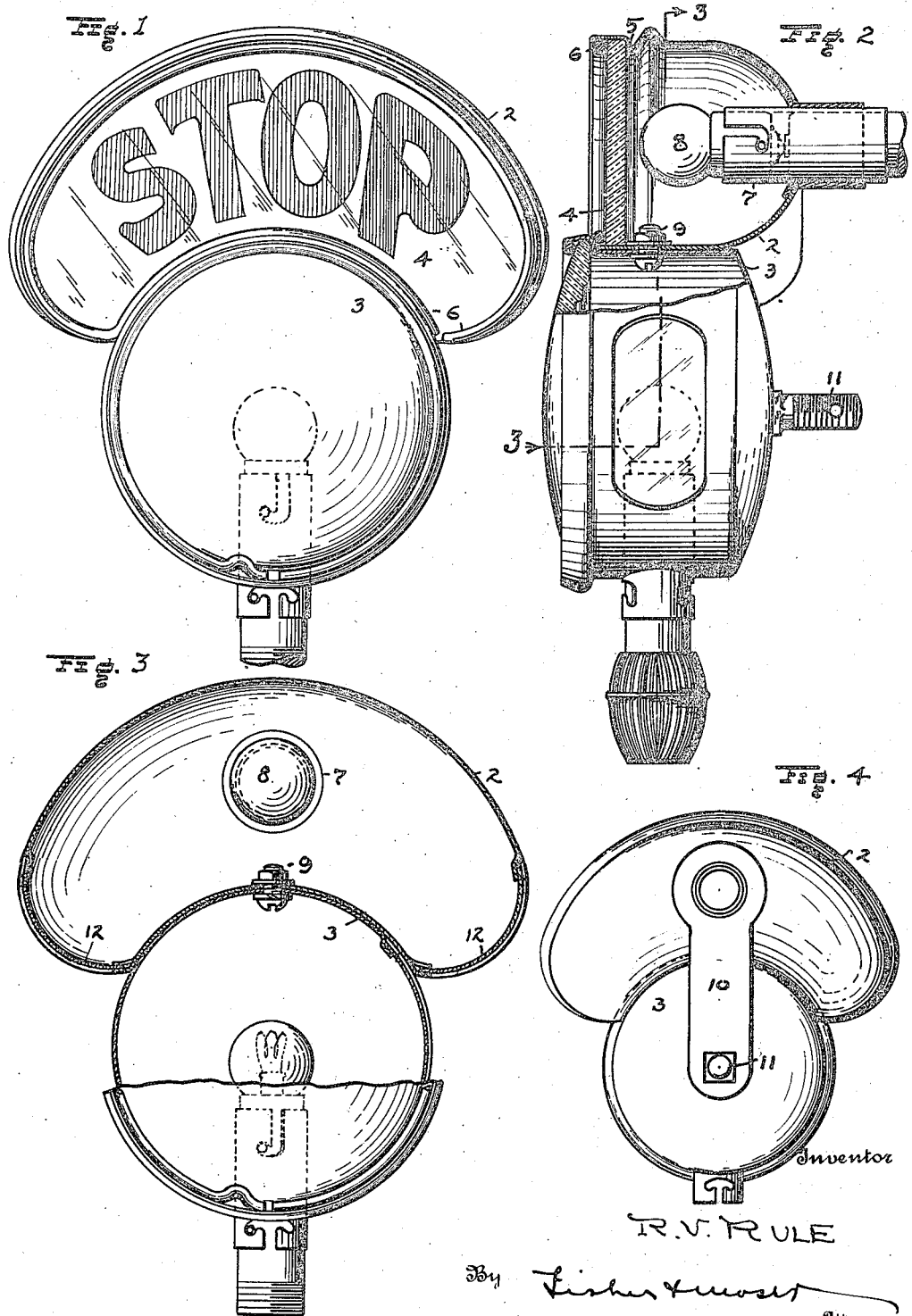

1,498,580

UNITED STATES PATENT OFFICE.

RAYMOND V. RULE, OF CLYDE, OHIO.

STOP SIGNAL FOR AUTOMOBILES.

Application filed September 20, 1921. Serial No. 502,048.

*To all whom it may concern:*

Be it known that I, RAYMOND V. RULE, a citizen of the United States, residing at Clyde, in the county of Sandusky and State of Ohio, have invented certain new and useful Improvements in a Stop Signal for Automobiles, of which the following is a specification.

This invention relates to an improvement in stop signals for automobiles, and the object of the invention is to provide an electric lamp especially constructed to be mounted upon the ordinary tail light or lamp of an automobile and adapted to be operated automatically by the brake or clutch pedal and the throttle controlling device of the automobile so that a warning signal will be displayed above the tail light as the speed of the vehicle is slackened or as the vehicle comes to a stop.

In the accompanying drawing, Fig. 1 is a front view of a tail light or lamp and my improved stop signal light or lamp mounted thereon, and Fig. 2 is a side elevation and sectional view of the same lamps affixed together. Fig. 3 is a vertical section looking rearwardly from line 3—3 of Fig. 2, and Fig. 4 is a reduced rear view of the same lamps secured together in a different way. Fig. 5 is a side elevation of an automobile showing the signal and tail lamps, together with the electric switch and operating devices for controlling signaling operation. Fig. 6 is a plan view of the motor and carbureter and the electric switch associated therewith. Fig. 7 is an enlarged end view of the switch box and the crank arm on the throttle controlling shaft. Fig. 8 is a horizontal section of the switch, open in full lines and closed in dotted lines.

The signal lamp comprises a hollow sheet metal body 2 of kidney shape adapted to fit snugly and securely upon the top side of the round body 3 of any automobile tail light or lamp in general use, and body 2 is of sufficient length to extend beyond the side walls of lamp body 3 and provide a relatively long arched display front in which a flat translucent plate 4, such as a red piece of glass, may be removably seated against an inwardly-extending bead 5 and locked in place by a split spring wire 6 bent to conform to the arched or kidney shaped walls of the body. A lamp socket 7 which extends into the rear side of body 2 is adapted to hold an electric bulb or lamp 8 behind the lens or plate 4 so that the letters thereon forming the word "Stop" will be brilliantly illuminated as occasion requires. The arched or incurved bottom of body 2 fits the round top side of lamp body 3 and is tightly held in seating position thereon by a single bolt or screw 9 located on the vertical median line of the two lamps, and the arched seat prevents the signal lamp from turning on the screw when the parts are tightly bolted together. In Fig. 4, a single strap 10 is shown as uniting the two lamps, the lower end of the strap being engaged with the supporting screw or stem 11 which projects rearwardly from the center of tail lamp 3. The rounded ends of signal lamp 2 are also provided with openings covered with pieces 12 of celluloid to permit the light from electric bulb 8 to be projected downwardly at each side of tail lamp 3 thereby making the stop light more distinctive than the tail light.

In operation the signal lamp is illuminated whenever the driver of the vehicle operates either the foot pedal or the throttle in bringing the machine to a standstill or in slackening the speed of the vehicle. Thus in Figs. 5 to 8, Sheet 2, I show a simple form of electric switch comprising a box 15 having an arm 16 adapted to be bolted to one side of the engine 17 at a point closely adjacent to a crank arm 18 on a controlling rod 19 which extends upwardly and parallel with the steering column into the vehicle body where the operator is adapted to manipulate the same in controlling the gas supply for the engine. In the type of engine shown a rod 20 connects crank arm 18 with a throttle arm 21 of the carbureter 22 for the engine, and the electric switch comprises a spring lever 23 having a bent extremity 24 adapted to be engaged and pressed inward by arm 18 when the controlling rod 19 is rotated to cut off or reduce the supply of gas through throttle 21. As this occurs spring lever 23 is pressed inward to place a spring contact blade 25 in contact with a terminal 26, thereby closing the signal light circuit c and illuminating the stop light. The general practice is to adjust the throttle lever so that the engine cannot be completely cut off from the supply of gas and to keep the engine running at a slow speed, and the electric switch is in reality closed when the supply of gas is merely reduced and the engine is still running so that the stop light will be displayed when the vehicle slackens its speed or is traveling at a slow speed. Provision is also made for closing the switch independently of the throttle controlling means for the engine. Thus, switch box 15 houses a crank member 27 extending upright at one side of spring lever 23 where it is adapted to be turned into contact with said lever to effect closing of switch blade 25, and turning of crank member 27 is effected by a right-angled arm 28 having a loop 29 through which a push rod 30 extends and which push rod is pivotally connected to a foot pedal 31. This foot pedal is preferably the brake controlling pedal for the vehicle or in some types of cars the connection may be with the clutch pedal. As shown when pedal 31 is operated crank member 27 is turned and the switch is closed independently of the throttle controlling device represented by rod 19 and arm 18.

What I claim is:

As a new article of manufacture a stop light comprising a casing having a substantially kidney shaped vertical cross section, the reentrant portion being shaped to fit a tail-light casing, and a bolt passing through said reentrant portion.

RAYMOND V. RULE.